Figure 3:
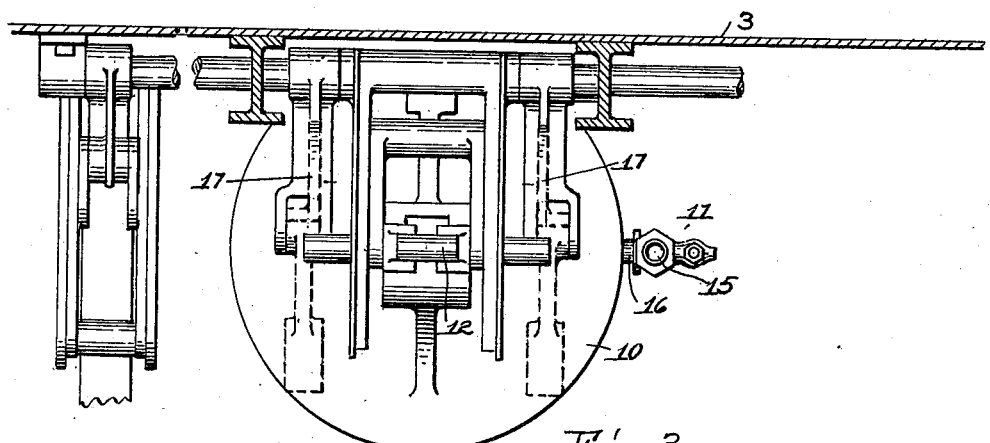

F. W. HUBBARD.
DUMP CAR.
APPLICATION FILED AUG. 18, 1910.
1,029,194.
Patented June 11, 1912.
3 SHEETS—SHEET 1.
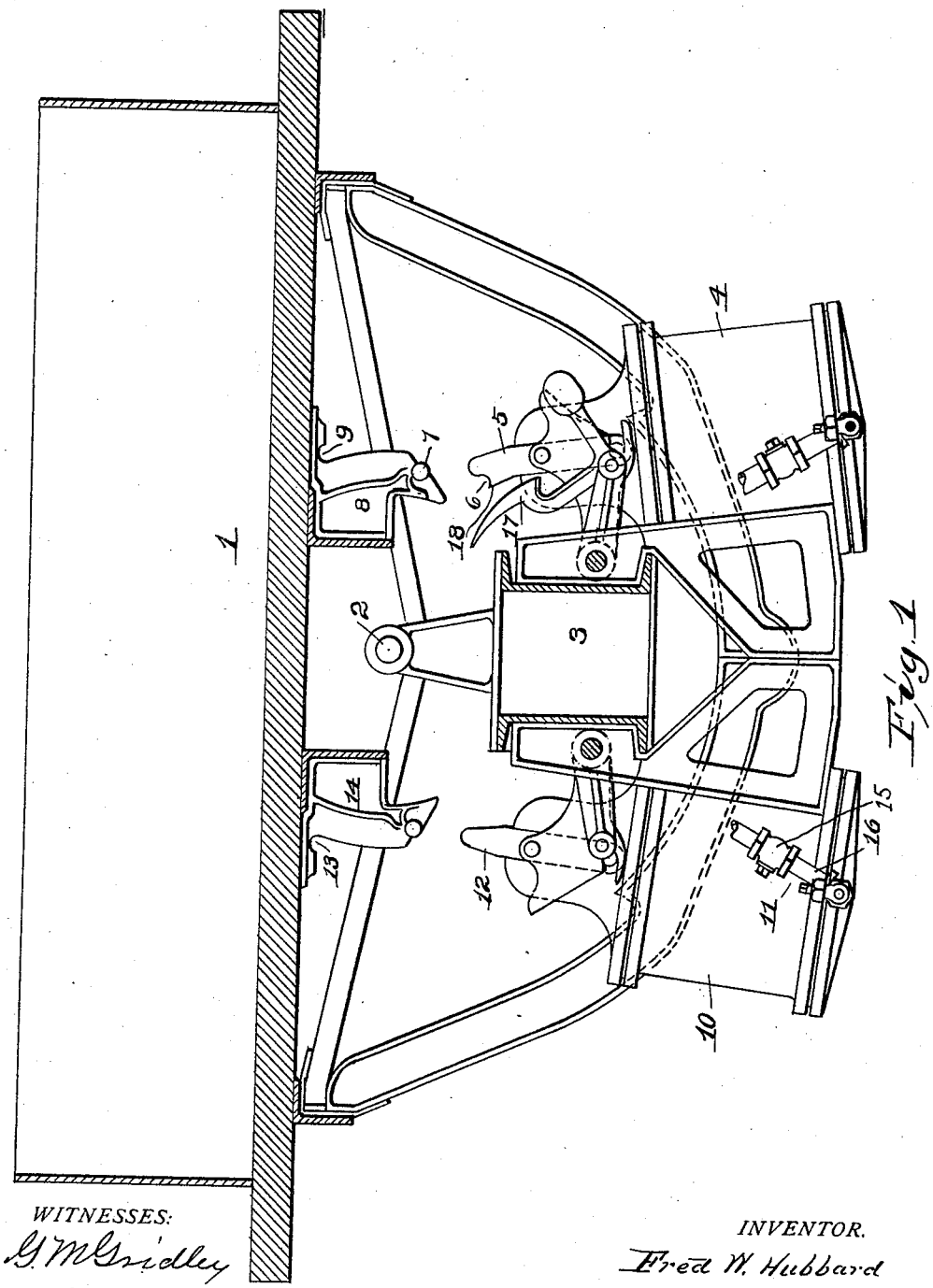
WITNESSES:
G. M. Gridley
S. L. Eaton
INVENTOR.
Fred W. Hubbard
BY
Geo. W. Rightmire
ATTORNEY.

F. W. HUBBARD.
DUMP CAR.
APPLICATION FILED AUG. 18, 1910.

1,029,194.

Patented June 11, 1912.

3 SHEETS—SHEET 2.

WITNESSES:

INVENTOR.
Fred W. Hubbard
BY
Geo. W. Rightmire
ATTORNEY.

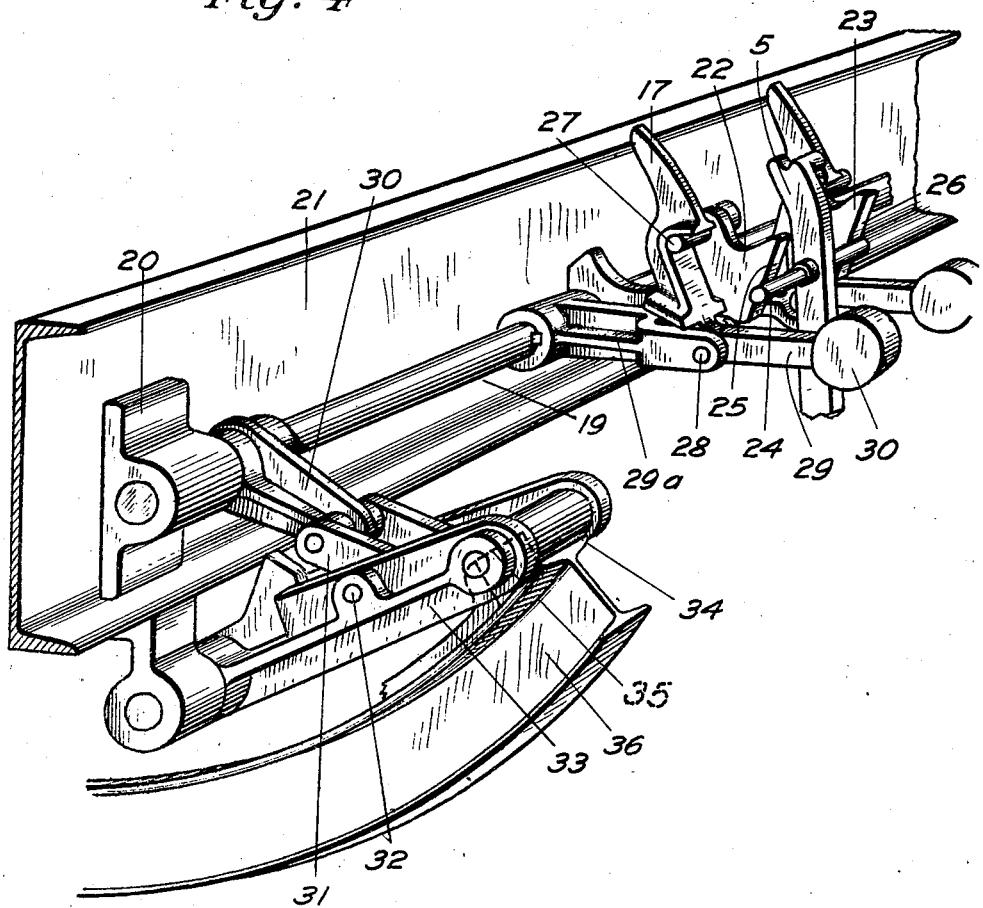

UNITED STATES PATENT OFFICE.

FRED W. HUBBARD, OF COLUMBUS, OHIO, ASSIGNOR TO THE KILBOURNE AND JACOBS MANUFACTURING COMPANY, OF COLUMBUS, OHIO, A CORPORATION OF OHIO.

DUMP-CAR.

1,029,194.  Specification of Letters Patent.  Patented June 11, 1912.

Application filed August 18, 1910. Serial No. 577,783.

*To all whom it may concern:*

Be it known that I, FRED W. HUBBARD, a citizen of the United States, residing at Columbus, in the county of Franklin and State of Ohio, have invented certain new and useful Improvements in Dump-Cars, of which the following is a specification.

This invention relates to improvements in dump cars and has special reference to the style of dump car shown in the drawings of application Serial No. 511,662, for Letters Patent of the United States, filed August 6, 1909, for improvements in dump car lock, by Messrs. Stensill, Doty, and Hubbard.

The improvement made herein is necessitated by the conditions under which the car is frequently operated. Where the dumping is to be done along a trackway embedded in the earth or resting on the earth, no detrimental results are experienced, but where the dumping takes place on a trestle or other overhead structure, the impact of the car bed against the underframe when the car is dumped, violently shocks the trestle structure, and in a short time weakens it materially. It will be seen that in a long car carrying from twenty-five to thirty-five tons of earth or other matter when dumped through the distance that cars of this style are operated, the stress set up by the impact of the dumping car bed will necessarily be very great.

The purpose of this invention is to modify the construction and operation of the car dumping means shown in the said application so as to cushion the car bed in its dumping, permitting the side which is lowered in dumping to fall normally almost to the limit and there check it by means of an air cylinder preferably, from which point the descent to the limit of the dumping movement is cushioned and therefore easy and slow. The initial fall, however, is great enough with this cushioning construction to give a decided inclination to the bottom of the car bed and thereby give the lading its initial movement toward the discharge. This arrangement and provision of cushioning devices will prevent the shock and the stresses upon the trestle or overhead structure upon which the car is being dumped, and at the same time will efficiently carry out the dumping operation. The construction to accomplish these purposes will be hereinafter set forth and embodied in the claims.

Figure 2:
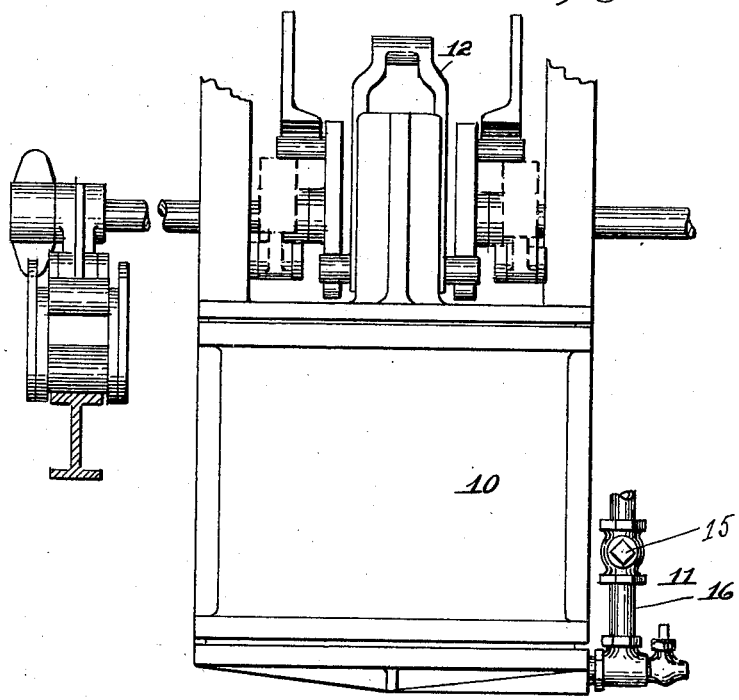

In the drawings which are hereto attached and hereby made a part of this specification—Figure 1 is a transverse vertical section of a car having the dumping and the cushioning means shown thereon; Fig. 2 is a view from the left in Fig. 1 showing in detail parts of the dumping devices left after the removal of certain parts, and slight modifications to adapt the same to the cushioning function. Fig. 3 is a top view of the showing in Fig. 2, the members 17 hereafter mentioned being in dotted lines to show their positions merely, said members being removed, as stated above in reference to Fig. 2. Fig. 4 is a perspective view of one side of the center sill of said car having the locking and controlling devices thereon.

Referring to the drawings, 1 is a car bed pivoted at 2 on the underframe construction shown generally at 3, and at 4 is shown an air cylinder containing the arm 5 carried upon the upper end of the piston rod. The upper end of the arm is notched at 6 so as to engage the shoulder 7 on the bracket member 8, which is secured to the underside of the car bed. The arm 5 is adapted to engage the shoulder 7 to dump the car toward the left as shown in Fig. 1. When it is intended to dump the car to the right, as shown in Fig. 1, the arm 5 may be removed (it not being deemed necessary to show and describe in detail a construction permitting this removal, since it is easily formed) and is placed on the piston rod in air cylinder 10 on the opposite side of the car, arm 12 having first been removed therefrom. When arm 5 is thus located on the left side of the car, as shown in Fig. 1, it is in proper position to dump the car to the right, the notch 6 engaging the shoulder 7$^a$ formed on the bracket member 14. When arm 5 is transposed to the left side, arm 12 is transposed to the right side, and the function of said arm 12 will be hereinafter described; said arm 12 at its upper end is rounded somewhat so as to pass by the shoulder 7$^a$ and engage the notch 13, or when said arm 12 is positioned on the opposite side of the car, it will pass by shoulder 7 and engage notch 9, the purpose thereof being presently described. This transposition of arms 12 and 5 is readily made, although usually the dumping of material from a car is made on the same side for a number of loads.

Referring to Fig. 4, a short shaft 19 is mounted in appropriate bearings on the underframe of the car; a bracket 20 is provided on the center sill 21, furnishing a bearing for the shaft 19 at one end, and a similar bearing is provided at the other end; (not shown) said shaft 19 has loosely mounted thereon the cam members 22, 23, between which is adapted to extend the arm 5 or 12 mounted on the piston, and which carries pins on its opposite sides, one being shown at 24, for engaging the faces 25 and 26 of said cams 22 and 23. When the piston arm is lifted, the cam members are rotated on the shaft 19 as a pivot, and consequently, the shaft is not operated thereby. It is necessary however to operate the shaft, and for that purpose a pin is provided on each of the said cam members 22, 23, one pin being shown at 27, and a latch 17, pivotally mounted at 28, has a rigid arm 29 weighted at 30, whereby the latch is kept in engaging position with said pin.

It is seen that the upward movement of the piston arm 5 or 12 will set up a rotary movement of the cam members 22, 23, which will carry the latch 17 upwardly, thereby rotating the shaft 19 through the crank arm 29ª. The effect of this rotation of the shaft is to lift the arm 30, and thereby the pivoted link member 31 connected by the pin 32 with a locking member 33. Roller 34 mounted at the end of the locking member 33 engages the shoulder 35 formed on the locking band 36, and when the shaft 19 is rotated, as described, the roller 34 is lifted out of engagement with the shoulder 35, whereby the car bed 1 is free to be dumped. The effect of moving the piston upwardly is therefore to unlock the car bed, and if it is desired to operate the piston without affecting the locking devices, the latch 17 may be removed, whereupon the outward movement of the piston arm will lift the cams 22, 23, which are free to rotate on the shaft 19, and thereby the shaft is not disturbed. In Fig. 1 the latch 17 is shown on one side of the car and omitted on the other side, so that the piston arm 12 may be moved without in any way affecting the locking of the car. This is done for a purpose hereinafter described.

Assuming that the car is loaded, and the bed and other parts are in their normal position, and it is desired to dump toward the left side as shown in Fig. 1; arm 12, by the introduction of air into the cylinder 10 through the construction shown generally at 11 is elevated into engagement with the notch 13, in the bracket 14. The volume of air admitted to the cylinder 10 is just sufficient to lift the arm 12 to this position, and the greater part thereof will remain in the cylinder. Immediately after the arm 12 has been thus positioned, the car is dumped by forcing the arm 5 into contact with the shoulder 7, and as the car bed tilts, the arm 12 is quickly forced downwardly, compressing the air in cylinder 10 to a small volume. The magnitude of this volume will be determined by the degree of opening of the exhaust valve 15 in the pipe 16, the adjustment of said valve being such that enough air will remain under compression to cushion the car bed and relieve the underframe of the car and the trestle from the shock and stress incident to the dumping. The air in cylinder 10 will not bring the car bed to a decided pause until the tilting has proceeded sufficiently to cause the lading to begin to move so that the dumping operation will be assured. The air under compression in cylinder 10 gradually escapes, permitting the arm 12 to descend, and the car bed thereby reaches its lowest tilted position. In this manner the lading is thoroughly discharged and both the car and the trestle upon which it stands are protected against undue shocks and stresses. If it be desired to dump the car in the opposite direction as shown in Fig. 1, arms 12 and 5 are transposed and latch 17 is transferred to the opposite side of the car also. It is apparent that the piston arm 5 when moved upwardly will cause the car bed to be unlocked in the position shown in Fig. 1, but that the piston arm 12 when moved upwardly, does not in any manner affect the locking of the car bed; this is essential, for the car must remain locked until the dumping operation is about to begin and then must be unlocked by the piston which effects the dumping. It is readily seen that, if the car bed were unlocked by the upward movement of the piston arm 12 as shown in Fig. 1, if the car were more heavily laden on the opposite side, dumping toward that side would immediately take place, to the serious injury of the car.

The construction of the parts is such that the transposition of piston arms is easily effected and the transfer of the latch can readily be made.

What I claim is:

1. In a dump car, an air cylinder, a piston rod therein adapted to engage the car bed to dump the same, a second air cylinder, a piston rod therein adapted to be elevated into engagement with the car bed, the air thus lifting the said last mentioned piston rod being retained in said cylinder in sufficient volume to cushion the car bed in its dumping operation.

2. In a dump car, an air cylinder, a piston rod therein adapted to engage the car bed to dump the same, a second air cylinder on the opposite side of said car, a piston rod therein adapted to be elevated into engagement with the car bed before the dumping operation begins, the air thus lifting said last mentioned piston rod being retained in said cylinder in sufficient volume to cushion the car bed in its dumping movement toward the side on which said second cylinder is located.

In testimony whereof I affix my signature in the presence of two witnesses.

FRED W. HUBBARD.

Witnesses:
F. R. ACKLAND,
F. A. JACOBS.

Copies of this patent may be obtained for five cents each, by addressing the "Commissioner of Patents, Washington, D. C."